United States Patent Office 3,697,379
Patented Oct. 10, 1972

3,697,379
ASYMMETRIC REDUCTION OF SECO-STEROIDS
George C. Buzby, Jr., Philadelphia, George Greenspan, Narberth, and Emmett L. Buhle, Media, Pa., assignors to American Home Products Corporation, New York, N.Y.
No Drawing. Filed Apr. 28, 1970, Ser. No. 32,727
Int. Cl. C07c 167/00
U.S. Cl. 195—51 R         6 Claims

ABSTRACT OF THE DISCLOSURE

Optically active seco-steroids are prepared by microbiological reduction. The compounds are useful in the production of physiologically active steroids.

BACKGROUND OF THE INVENTION

Steroids produced by total synthesis from relatively simple chemical compounds, as taught, for example, by Smith et al., "Totally Synthetic Steroid Hormones, Part II," J. Chem. Soc. (1964) pp. 4472–4492, result in the formation of racemates. Using a convention approved by Fieser and Fieser, "Steroids," p. 336 (1959), the compounds designated as the d-forms are the enantiomers corresponding in configuration at C–13 to that of the natural hormone estrone. The corresponding enantimorphs are consequently designated the l-forms and the racemates the dl-forms.

Since hormonal effects deemed of value have been assigned essentially to the d-series, procedures directed to the formation of such compounds would be of interest. It is obvious that this problem could be attacked by the preparation of the d-form of one of the intermediates which would result in the d-form of a complete hormonal steroid.

Along the latter lines, Gibian et al. describe the formation of optically active seco-steroids by a microbiological process using a yeast of the genus Saccharomyces in Tetrahedron Letters No. 21, pp. 2321–2330 (1966). The same biological genus is also mentioned, and for the same purpose, by Rufer et al. in Liebigs Ann. Chem. 702, pp. 141–148 (1967).

The invention relates to optically active seco-steroids and particularly to the use of specific microorganisms for obtaining them.

The process broadly involves the fermentative reduction of selected seco-steroids using the specific microorganisms of *Pichia farinosa* NRRL Y–118 or *Pichia farinosa* CBS 185.

The reaction may be illustrated by the following diagrams:

wherein R and R' each represent alkyl radicals. These compounds are known and described, for example, in Smith's British Pat. No. 1,041,273, the complete specification published Sept. 1, 1966.

In accordance with the present invention, it has been found that microorganisms or enzymes produced therefrom of *Pichia farinosa* NRRL Y–118 or *Pichia farinosa* CBS 185 are capable of reducing the seco-steroids described above to optically active compounds and particularly to valuable d-17β-hydroxy seco-steroids.

The compounds resulting from the reduction step are highly useful intermediates for the preparation of optically active steroids of the type described in the aforementioned publications of Gibian et al. and Rufer et al. Steroids having an aromatic A-ring as produced from these intermediates are hormonally active estrogens and useful, for example, in the reduction of hyperlipemia in warm-blooded animals.

Reverting to the process of the invention, it is carried out by first cultivating the selected microorganism in typical growth media comprising assimilable carbon, preferably a carbohydrate such as dextrose, a source of nitrogen, preferably organic nitrogen such as proteinaceous substances, for example, corn steep liquor and/or peptone, and water.

Following the incubation of the microorganisms to the extent desired, the selected seco-steroid substrate is added, preferably in a solvent, under sterile and aerobic conditions. A suitable antifoam agent is helpful and may also be present. Agitation is carried out with the temperature being maintained in the range of 25° to 37° C. for a period of time sufficient to effect the desired transformation or biochemical conversion of the seco-steroid to the optically active compound.

On termination of the microbiological reduction, the fermentation broth is extracted with a suitable solvent, for example, ethyl acetate or methyl isobutyl ketone, and the extracts so obtained are concentrated to remove the solvent, the temperature being held below 50° C. The desired product in the form of the d-form of a 3-alkoxy-17β - hydroxy - 8,14 - secogona - 1,3,5(10),9(11)-tetraen-14-one is then isolated by usual techniques from the residue.

The following examples describe and illustrate various aspects of the process in greater detail.

EXAMPLE I

The following illustrates the use of 3-methoxy-8,14-secoestra-1,3,5(10),9(11)-tetraene-14,17-dione as steroid substrate to produce d-3-methoxy-8,14-secoestra-1,3,5(10),9,11-tetraen-17-β-ol-14-one.

An agar slant of *Pichia farinosa* NRRL Y–118 was washed with 5 ml. (milliliters) of a medium of the following composition:

Corn steep liquor _____ g__ 20
Peptone _____ g__ 20
Dextrose _____ g__ 50
Distilled H₂O _____ l__ 1 pH adjusted to 7.0 with 5 N NaOH before autoclaving.
One ml. of the cell suspension was transferred to a 250 ml. flask containing 50 ml. of the medium described above. The flask was incubated at 28° C. (centigrade) on a rotary shaker, 250 r.p.m., 2″ diameter of rotation.

Following 24 hours of growth, 5 ml. of the resulting cell suspension was transferred to another flask with the same medium. After 16 hours of incubation, 10 mg. of 3-methoxy-8,14-secoestra - 1,3,5(10),9(11) - tetraene-14, 17-dione dissolved in ethanol was added to the flask. Five ml. samples were taken at three and six hours, and each sample was equilibrated with one ml. of methyl isobutyl ketone.

Aliquots of the solvent extracts were spotted on glass plates coated with silica gel, F 254 (Brinkmann), and the plates were developed in a mixture of chloroform-acetone (9:1). Examination of the plates under U-V (ultraviolet) light, after drying, disclosed a product spot of good size with the $R_f$ of d-3-methoxy-8,14-secoestra- 1,3,5(10),9(11)-tetraen-17-β-ol-14-one. The six hour sample showed an increase in product, with a small amount of substrate remaining unaltered.

After heating at 100° C. for 30 sec. (seconds) the plate was sprayed with a solution of phosphomolybdic acid (PMA) in ethanol (10 g. per 10 ml.). The color reaction of the product matched that of the standard compound.

EXAMPLE II

The following illustrates the use of 3-methoxy-8,14-secoestra-1,3,5(10),9(11)-tetraene-14,17-dione as steroid substrate, 1 g./l.

An agar slant of *Pichia farinosa* NRRL Y–118 was washed with 5 ml. of medium of the following composition:

N-Z Case (peptone) _____ g__ 20
Bacto-peptone _____ g__ 20
Dextrose _____ g__ 20
Distilled water _____ l__ 1

One ml. of the cell suspension was transferred to a 250 ml. flask containing 50 ml. of the above medium. The flask was incubated on a rotary shaker at 25° C., 250 r.p.m. (revolutions per minute), 1″ (inch) diameter of rotation.

After 23 hours of incubation, 5 ml. of the flask's contents was transferred to a second flask with the same medium. Following 19 hours of growth, 50 mg. (milligrams) of 3 - methoxy-8,14-secoestra-1,3,5(10),9(11)-tetraene-14,17-dione dissolved in 0.5 ml. of EtOH was added to the flask to give the high concentration of one g./l. Samples were taken after 6 and 24 hours of contact time; these were processed as described in Example I. Thin layer chromatography revealed a product with the $R_f$ of the 17β-ol analog and a small amount of substrate left with the 6 hour sample. Analysis of the 24 hour sample showed an increase in the 17β-ol with a trace amount of substrate remaining.

EXAMPLE III

Preparative scale fermentation of 3-methoxy-8,14-sesoestra-1,3,5(10),9(11)-tetraene - 14,17 - dione in 14 l. fermentor Three agar slants of *Pichia farinosa* NRRL Y–118 were each washed with 5 ml. of distilled water and the cell suspensions transferred to three one l. flasks, each with 200 ml. of the medium listed in Example II.

The flasks were incubated for 24 hours at 26° C. on a rotary shaker, 250 r.p.m., after which their contents were transferred to a 14 l. fermentor containing 6 l. of the inoculum medium. The agitation was set at 250 r.p.m., aeration at 6 l. and temperature at 25° C.; Dow Corning Silicone B, diluted 1:2, was utilized as an antifoam agent.

Following 18 hours of incubation, 18 g. of 3-methoxy-8,14-secoestra-1,3,5(10),9(11)-tetraene-14,17-dione (3 g./l.) dissolved in 90 ml. of ethanol was added to the fermentation. The agitation was increased to 300 r.p.m. and the aeration was decreased to 3 l. Thirty ml. of ethanol was added to the fermentor 24 hours after steroid addition. At 77 hours, the agitation was reduced to 150 r.p.m., and one-half hour later 120 ml. of ethanol was added.

The fermentation, 5.7 l., was harvested at 121 hours, with some substrate remaining. (A sample taken from a 14 l. fermentation to which 3-methoxy-8,14-secoestra-1,3, 5(10),9(11)-tetraene - 14,17 - dione was added at 1 g./l. showed a similar degree of unaltered substrate.) Solvent extraction was carried out with 4 l. of methyl isobutyl ketone, and the combined extracts were washed with NaHCO$_3$ solution and dried with Na$_2$SO$_4$.

The extracts were concentrated to a solvent-free residue which was dissolved in di-isopropyl ether and stored at −10° C. overnight. The precipitated product was filtered and dried (.1 mm./1 hour/P$_2$O$_5$) to provide 10.0 g. m.r. (melting range) 118–120° C.; $[\alpha]_D^{24}$=−30° (degrees optical rotation) (c.=2, dioxane), 58.8% (percent) yield.

The above material was recrystallized from di-isopropyl ether to give 7.175 g.; m.r. 112–114° C.; $[\alpha]_D^{25}$=−36° (degrees optical rotation) (c.=2, dioxane).

EXAMPLE IV

Preparative scale fermentation of *Pichia farinosa* NRRL Y–118 with 3-methoxy-8,14-secoestra-1,3,5(10),9(11)-tetraene-14,17-dione added at 1 g./l.

The procedure followed was similar to that pursued in Example II with two exceptions. The agitation for the inoculum flasks was lowered to 215 r.p.m. and the medium composition was changed to:

N-Z Case (peptone) _____ g__ 10
Bacto-peptone _____ g__ 10
Dextrose _____ g__ 20
Distilled water _____ l__ 1

Six grams of 3 - methoxy - 8,14 - secoestra-1,3,5(10), 9(11) - tetraene - 14,17 - dione in 60 ml. of ethanol was added to the fermentor after 18 hours of growth. Six hours later 144 mg. of MgSO$_4$·7H$_2$O was added to the fermentation. After a further 18 hours, the addition of MgSO$_4$·7H$_2$O was repeated.

The fermentation, 6 l., was harvested at 48 hours and two l. of the whole broth was extracted with 500 ml. of cyclohexane. Because of poor separation of solvent and broth, the mixture was pooled with the remaining 4 l., and the new mixture was extracted with 1 l. of methyl isobutyl ketone. After separation of the cells by centrifugation, they were extracted with 1 l. of the second solvent. The fluid was also extracted with 2 l. of methyl isobutyl ketone. The combined extracts were washed twice with NaHCO$_3$ solution and dried with Na$_2$SO$_4$.

The pooled extracts were concentrated to a solvent free residue, which was dissolved in diisopropyl ether and chilled at −10° C. to provide the product, 3.40 g.; m.r. 109–110° C.; $[\alpha]_D^{24}$=−36° (c.=2, dioxane); 57.5% yield.

EXAMPLE V

The following illustrates the use of 13β - ethyl - 3-methoxy - 8,14 - secogona - 1,3,5(10),9(11)-tetraene-14,17-dione as steroid substrate.

A 250 ml. flask with 50 ml. of the medium described in Example II was inoculated with a cell suspension of *Pichia farinosa* NRRL Y–118 as previously noted. Incubation was carried out on a rotary shaker, 215 r.p.m., at 26° for 24 hours. A five ml. transfer was then made to a second flask with the same medium. After 18.5 hours of growth, 50 ml. of 13β - ethyl - 3 - methoxy - 8,14-secogona - 1,3,5(10),9(11) - tetraene - 14,17 - dione dissolved in 0.5 ml. EtOH was added to the flask, giving the high concentration of 1 g./l.

Thin layer chromatography analysis of a sample taken at 23 hours and processed as in Example I showed the 17β - ol derivative, d - 13β - ethyl - 3 - methoxy-8,14-secogona-1,3,5(10),9(11) - tetraen - 17β - ol - 14 - one, with the barest trace of remaining substrate.

EXAMPLE VI

Preparative scale fermentation of 13β - ethyl - 3-methoxy-8,14 - secogona - 1,3,5(10),9(11) - tetraene - 14,17-dione in 14 l. fermentor (1 g./l. in two one-half g. additions).

Three 1 l. inoculum flasks were prepared and inoculated with cells of *Pichia farinosa* NRRL Y–118 as detailed in Example III. Incubation of the flasks (215 r.p.m.) and transfer of their contents to a 14 l. fermentor with 6 l. of the same medium were carried out as in Example III. The conditions of growth in the fermentor were also the same except for the temperature which was set at 26° C.

After 18 hours of growth in the fermentor, 3 g. of 13β-ethyl - 3 - methoxy - 8,14 - secogona - 1,3,5(10),9(11)- tetraene - 14,17 - dione dissolved in 60 ml. of ethanol (or 0.5 g./l.) was added. Aeration was maintained at 6 l. of air, while agitation was increased to 300 r.p.m. Seven hours later the addition of 13β - ethyl - 3 - methoxy-8,14-secogona - 1,3,5(10),9(11) - tetraene - 14,17 - dione was repeated. At 24 hours, the fermentation, 6.15 l., was harvested for extraction with methyl isobutyl ketone. After the first extraction with 1 l. of solvent, the cells were filtered off and extracted with 1.5 l. of the same solvent. The filtrate was then extracted with three l. of methyl isobutyl ketone.

The combined extracts were washed twice with $NaHCO_3$ and dried with $Na_2SO_4$, after which they were reduced to a solvent free residue, dissolved in diisopropyl ether and stored at 10° C. overnight. Filtration and drying provided the product (3.275 g.); (m.r. 87–89° C.); $[\alpha]_D^{24}=+10°$ (c.=2, dioxane); 54.6% yield.

Reduction of the mother liquors in vacuo and trituration of the residue with cyclohexane provided an additional 0.450 g.; m.r. 87–89° C.; $[\alpha]_D^{24}=+11°$ (c.=2, dioxane) for a total yield of 62%.

EXAMPLE VII

*Pichia farinosa* NRRL Y–118 in a preparative scale run with 13β - ethyl - 3 - methoxy - 8,14 - secogona-1,3,5(10,9(11) - tetraene - 14,17 - dione (1 g./l.).

The fermentation described in Example VI, was repeated, except that the 13β - ethyl - 3 - methoxy-8,14-secogona-1,3,5(10),9(11) - tetraene - 14,17 - dione was added in a single addition at 1 g./l. (6 g.) after 17 hours of growth in the fermentor. The whole broth, 6 l., harvested at 6 hours, was extracted with methyl isobutyl ketone as noted in the earlier example. The cells, after filtration, were extracted with 1 l. of solvent and the filtrate with three l. of solvent.

The combined extracts were washed and dried as in Example V and concentrated to dryness. Trituration with hot cyclohexane followed by concentration to one-half volume provided the product 3.95 g.; m.r. 80–86° C.; $[\alpha]_D^{24}=+7°$ (c.=2, dioxane) for 65.7% yield. Thin layer chromatography showed product to contain only a trace of starting material with no other contaminant.

EXAMPLE VIII

Preparative scale fermentation of 13β-ethyl-3-methoxy-8,14 - secogona - 1,3,5(10),9(11) - tetraene - 14,17-dione. 2 g./l., with *Pichia farinosa* NRRL Y–118.

Another fermentation in a 14 l. fermentor was prepared in the medium utilized in Example II. The fermentation procedure was similar to that of Example VI, except that the growth stage in the fermentor was one hour less, 17 hours. Twelve g. of 13β - ethyl - 3 - methoxy-8,14 - secogona - 1,3,5(10),9(11) - tetraene - 14,17-dione dissolved in 90 ml. of ethanol was added at this time. Sixty ml. of ethanol was added twice to the tank after steroid addition, once after eight hours and again five hours later. The temperature in the fermentor ranged from 24° C. to 28° C. during the run.

The fermentation, 6 l., was harvested at 25 hours and extraction was carried out with methyl isobutyl ketone as noted in Example VII. Trituration of the evaporated extract with hot cyclohexane provided the product 7.235 g.; m.r. 86–88° C.; $[\alpha]_D^{24}=+9°$ (c.=2, dioxane); 60.2% yield.

EXAMPLE IX

13β-ethyl-3-methoxy-8,14 - secogona - 1,3,5(10),9(11)-tetraene-14,17-dione added to 14 l. fermentor at 2 g./l. (Two one gram additions.)

The fermentation with *Pichia farinosa* NRRL Y–118 was prepared as described in Example VI, except that the growth period in the fermentor was reduced to 16 hours. Six grams of 13β-ethyl-3-methoxy-8,14-secogona-1,3,5(10),9(11)-tetraene-14,17-dione was added in 60 ml. of ethanol. Five and one-half hours later another 6 g. of 13β-ethyl-3-methoxy-8,14 - secogona-1,3,5(10), 9(11)-tetraene-14,17-dione was similarly added to give a total concentration of 2 g./l. Thirty ml. of ethanol was added to the run after an additional five and a half hours of incubation. The temperature was 26–26.5° C.

The fermentation broth, 5.8 l., was harvested after 12 hours of contact time and extracted, as described in Example VII, except that the cells were extracted four times with 1.5 l. of methyl isobutyl ketone. The combined extracts were concentrated to a solvent-free residue. Trituration with warm (50° C.) cyclohexane followed by filtration provided the product, 9.61 g., m.r. 70–80° C.; (83% yield). To remove pigment, isolate was recrystallized from cyclohexane to yield 7.20 g.; m.r. 87–88° (62%); $[\alpha]_D^{24}=+10°$ (c.=2, dioxane). Thin layer chromatography on this material and on the originally isolated product showed only trace starting material as the main contaminant.

EXAMPLE X

*Pichia farinosa* NRRL Y–118 with 13β-ethyl-3-methoxy-8,14-secogona-1,3,5(10),9(11)-tetraene - 14,17 - dione added at 3 g./l. (3 one g. additions.)

The fermentation procedure with *Pichia farinosa* NNRL Y–118 was similar to that followed in Example IX, with the first addition of 13β-ethyl-3-methoxy-8,14-secogona-1,3,5(10),9(11) - tetraene-14,17 - dione, six grams in 60 ml. of ethanol (1 g./l.), made after 16 hours growth in the fermentor. Five and one-half hours later a second addition of 13β-ethyl-3-methoxy-8,14-secogona-1,3,5(10),9(11)-tetraene-14,17-dione, 1 g./l. was made; after a similar interval a third addition of the compound was carried out to give a total concentration of 3 g./l.

After 19 hours of fermentation time, the mixture, 5.84 l., was extracted with 1 l. of methyl isobutyl ketone. The cells were separated by centrifugation and extracted four times with 1.35 l. of solvent, while the supernatant was extracted five times with 5 l. of the solvent. After washing and drying, the combined extracts were concentrated to a solvent free residue. This residue was stirred vigorously with cyclohexane (300 ml.) at room temperature and the precipitated product filtered and dried to provide 11.275 g., 64.3%; m.r. 75–80° C.; $[\alpha]_D^{24}=+8°$ (c.=2, dioxane); GLC (gas liquid chromatography); 6 ft. SE 30, 3%, $CH_2Cl_2$(250°D 300°I 300°), indicated 96.2% purity.

EXAMPLE XI

*Pichia farinosa* NRRL Y–118 with 13β-ethyl-3-methoxy-8,14-secogona-1,3,5(10),9(11) - tetraene - 14,17-dione added at 3 g./l. (three 1 g. additions).

This fermentation of 13β-ethyl-3-methoxy-8,14-secogona-1,3,5(10),9(11)-tetraene-14,17-dione at 3 g./l. was run with *Pichia farinosa* NRRL Y–118 in the medium described in Example IV. The procedure duplicated that in Example X up to and including the first 1 g./l. addition of 13β-ethyl-3-methoxy-8,14-secogona-1,3,5(10), 9(11)-tetraene-14,17-dione. The second and third additions of steroid, one g./l. each, were made after seven and 18¾ hours respectively. Four hours following the second addition, 60 ml. of ethanol was added to the fermentation.

The fermentation, 5.04 l., was harvested after 30.25 hours of steroid incubation. The extraction procedure with methyl isobutyl ketone was as in Example X, except that the cells were extracted three times with one l. of solvent and the supernatant four times with 4 l. of solvent. Washing and drying of the combined extracts preceded their concentration to dryness to a solvent free residue, which was stirred at room temperature as in Example X, and filtered to provide the dried product (12.250 g.); m.r. 80–85° C.; $[\alpha]_D^{24}=+8°$ (c.=2, dioxane); 81.2% yield. GLC=91.5% purity.

EXAMPLE XII

*Pichia farinosa* NRRL Y-118 with 13β-ethyl-3-methoxy-8,14-secogona - 1,3,5(10),9(11) - tetraene-14,17-dione added at 1 g./liter, cells suspended in water.

Three agar slants of *Pichia farinosa* NRRL Y-118 were each washed with 5 ml. of distilled water, and the resulting cell suspensions were transferred to three one liter flasks each containing 200 ml. of the medium described in Example II. The flasks were incubated on a rotary shaker at 26° for 24 hours, after which their contents were transferred to a 14 l. fermentor with 6 l. of the same medium. Agitation was set at 250 r.p.m. aeration at 6 l. of air per minute and the temperature at 25° C.

After 17.5 hours of incubation, the fermentation mixture was centrifuged, the supernatants decanted, and the cells suspended in distilled water to give a volume of six liters. Six grams of 13β-ethyl-3-methoxy-8,14-secogona-1,3,5(10),9(11)-tetraene-14,17-dione dissolved in 60 ml. of ethanol were added. The agitation was increased to 300 r.p.m. After 10 hours of contact time, the agitation was lowered to 200 r.p.m.; aeration had fallen to zero and was restored to former level.

At 21 hours (aeration had again fallen to zero), the fermentation was harvested. A total volume of 5.85 liters was extracted with one liter of methyl isobutyl ketone (MIBK). After separation of the cells and fluid, each was extracted three times with three liters of MIBK each.

The combined extracts were washed twice with $NaHCO_3$ solution and dried with $Na_2SO_4$ and the solvents removed under reduced pressure. The solvent free residue was stirred with cyclohexane (300 ml.) for 4 hours and the precipitated solids filtered and dried to provide the product, 4.05 g. (69.2%); m.r. 84–86° C.; $[\alpha]_D^{25} = +12°$ (c.=2, dioxane); GLC=98.7% purity.

EXAMPLE XIII

*Pichia farinosa* NRRL Y-118 with 13β-ethyl-3-methoxy-8,14-secogona-1,3,5(10),9(11)-tetraene - 14,17 - dione added at 3 g./l. (one gram per addition), cells suspended in water.

The fermentation procedure was similar to that employed in Example XII, except that the temperature was 26° C.

After addition of 13β-ethyl-3-methoxy-8,14-secogona-1,3,5(10),9(11)-tetraene-14,17-dione at one gram per liter in 60 ml. of ethanol to the cell suspension, the aeration was reduced to 3 liters of air per minute and the agitation increased to 300 r.p.m. One-half hour later, the original aeration rate, six liters per minute, was restored. Two more additions of 13β-ethyl-3-methoxy-8,14-secogona-1,3,5(10),9(11)-tetraene-14,17-dione, six grams each, were made 5 and 10 hours after the first supplementation.

The fermentation was harvested at 46.5 hours, 5.5 l. The extraction procedure was similar to that noted in Example XII.

The combined extracts were reduced to a solvent free residue in vacuo. Stirring of the dried residue with cyclohexane (360 ml.) was performed at room temperature. The precipitated product was filtered and dried to yield 11.065 g. (67.1%); m.r. 86–88° C.; $[\alpha]_D^{20} = +12.5°$ (c.=1, dioxane); GLC=95.8% purity.

EXAMPLE XIV

*Pichia farinosa* NRRL Y-118 with 13β-ethyl-3-methoxy-8,14-secogona-1,3,5(10),9(11)-tetraene - 14,17 - dione added at one g./liter, in synthetic medium.

Three agar slant of *Pichia farinosa* NRRL Y-118 were each washed with 5 ml. of distilled water and the suspensions utilized to inoculate three one liter flasks, each with 200 ml. of Pacifici defined medium (Llyodia, 25, 37 (1962)):

| | G./l. |
|---|---|
| Mannitol | 30.0 |
| Succinic acid | 30.0 |
| $KH_2PO_4$ | 1.0 |
| $MgSO_4 \cdot 7H_2O$ | 0.3 |
| $FeSO_4 \cdot 7H_2O$ | 0.014 |
| $MnSO_4 \cdot H_2O$ | 0.00522 |
| $ZnSO_4 \cdot 7H_2O$ | 0.0037 |
| $H_3BO_3$ | 0.0025 |
| KI | 0.00076 |
| $AlCl_3 \cdot 6H_2O$ | 0.000054 |
| $CuSO_4 \cdot 5H_2O$ | 0.00003 |

$NH_4OH$ to pH 5.5.
Distilled $H_2O$ to 1000 ml.

The flasks were incubated on a rotary shaker at 28° for 24 hours and their contents transferred to a 14 liter fermentor containing six liters of Pacifici medium. Aeration and agitation were six liters of air per minute and 250 r.p.m., respectively.

After 16 hours of incubation, six grams of 13β-ethyl-3-methoxy-8,14-secogona-1,3,5(10),9(11) - tetraene - 14,17-dione dissolved in 60 ml. of ethanol were added. The agitation was increased to 300 r.p.m. Following 6.5 hours of contact time, the rate was lowered to 200 r.p.m.

The fermentation, 5.8 liters, was ended at 24 hours, and the work-up was carried out as described in Example XII, except that the cells were extracted with four liters of MIBK. The solvent was removed under reduced pressure and the solvent free residue was stirred at room temperature with cyclohexane (300 ml.). The precipitated solid was filtered and dried to provide the product, 4.45 g. (76.7%); m.r. 81–83° C.; $[\alpha]_D^{24} + 10°$ (c.=2, dioxane); GLC=98.2% purity.

EXAMPLE XV

*Pichia farinosa* CBS 185 with 3-methoxy-8,14-secoestra 1,3,5(10),9(11)-tetraene - 14,17 - dione added at one gram per liter in a cornsteep liquor medium.

Cell suspensions prepared as in Example XIV were transferred to three one liter flasks containing 200 ml. of the following medium:

| | G./l. |
|---|---|
| Corn steep liquor | 20 |
| Dextrose | 50 |

Distilled water 1 liter.
pH adjusted to 6.9 before autoclaving.

Following 24 hours of incubation on a rotary shaker at 28°, the contents of the three flasks were transferred to a 14 liter fermentor with 6 liters of the same medium. The temperature was set at 37°, aeration and agitation as in Example XIV.

After 17 hours of growth in the fermentor, six grams of 3-methoxy-8,14-secoestra - 1,3,5(10),9(11) - tetraene-14,17-dione dissolved in 60 ml. of ethanol were added; agitation was increased to 300 r.p.m.

The fermentation, 5.8 liters, was harvested in 13 hours, and the mixture was extracted with 1 l. of MIBK. The fluid portion was next extracted with three liters of MIBK and the cells with two liters. The combined extracts were washed twice with $NaHCO_3$ solution and dried with $Na_2SO_4$.

The MIBK extract was filtered through glass wool and concentrated under vacuum at 60° C. to a small volume. The residual MIBK was removed further by distilling it under vacuum with three 75 ml. portions of cyclohexane. The final volume was adjusted to 200 ml. with cyclohexane and the mixture heated to 75° C. and filtered while hot to remove the insoluble material. The filtrate was reheated to 75° C., then cooled over a two hour period to 5° C., where it was held for one additional hour.

The crystalline material was filtered, washed with 2× 10 ml. ice cold cyclohexane and dried at 35–40° C. The amount of product isolated was 3.5 g. (60.3%); m.r. 102–107°; $[\alpha]_D^{20} - 33.2°$ (c.=1, dioxane); GLC=93.8%.

EXAMPLE XVI

Reduction of 3-methoxy-8,14-secoestra-1,3,5(10),9(11)-tetraene-14,17-dione in a 10 l. fermentation.

One agar slant of *Pichia farinosa* NRRL Y-118 was washed with 10 ml. of distilled water and one milliliter of the resulting cell suspension was transferred to one 0.5 l. Erlenmeyer flask containing 100 ml. of a medium of the following composition:

| | |
|---|---|
| Corn steep liquor | 20 g. (w./v.). |
| Dextrose | 20 g. (w./v.). |
| Sperm Oil | 1 cc. |
| Tap $H_2O$ | 1 l. (liter). |
| pH adjusted to 6.7 with 50% (w./v.) NaOH before autoclaving. | |

The inoculated medium was incubated at 25° C. on a rotary shaker, 250 r.p.m., 2" diameter of rotation, for 24 hours. At this time the total cell count, as determined by a Petroff-Hausser bacterial counting chamber, was approximately $3.0 \times 10^8$ cells per ml.

One hundred mls. of the above seed was aseptically transferred to a 4 l. aspirator vessel containing 1 l. of the previously described medium. The inoculated vessel was again incubated at 25° C. on a rotary shaker, 250 r.p.m., 2" diameter of rotation, for 24 hours.

The entire contents of the aspirator vessel (1 l.) were transferred to a 14 l. fermentor vessel containing 10 l. of the previously described medium. The agitation was maintained at 300 r.p.m. and the aeration level was held at 3 liters per minute throughout the entire conversion cycle.

Following 16 hours of growth at 25° C., 10 grams of 3 - methoxy - 8,10 - secoestra - 1,3,5(10),9(11) - tetraene-14,17-dione dissolved in 280 ml. of ethanol was added to the broth. Two identical additions were made at 20 and 24 hours. A >95% conversion of d-3-methoxy-8,14-secoestra-1,3,5(10),9(11)-tetraen-17-β-ol-14-one was obtained after 35 hours incubation. The percent conversion was determined by gas-liquid chromatography (GLC) of a broth sample previously extracted with methyl isobutyl ketone.

The cells were separated from the converted broth by absorption on celite. The product was extracted with heptane at a temperature of 70-75° C. A total of 19.5 grams of product was obtained as pure crystalline material which represents an overall yield of 65 percent.

What is claimed is:

1. The process comprising asymmetrically reducing an 8,14-secogona-tetraene - 14,17 - dione by subjecting said compound to the reducing activity of *Pichia farinoso* NRRL Y-118 or CBS 185 and isolating an optically active d-17β-hydroxy-8,14-secoestra-tetraen-14-one.

2. The process of claim 1 where the microorganism is *Pichia farinosa* NRRL Y-118.

3. The process of claim 1 where the microorganism is *Pichia farinosa* CBS 185.

4. The process of claim 1 wherein the compound to be asymmetrically reduced has the formula:

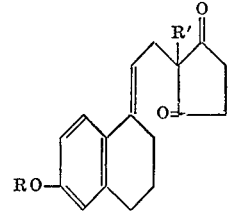

in which R and R' represent lower alkyl.

5. The process of claim 4 in which R and R' each stands for methyl.

6. The process of claim 4 in which R stands for methyl and R' represents ethyl.

References Cited

UNITED STATES PATENTS 3,579,544   5/1971   Hiraga et al. _____ 195—51 R

ALVIN E. TANENHOLTZ, Primary Examiner

PO-1050
(5/69)

UNITED STATES PATENT OFFICE
CERTIFICATE OF CORRECTION

Patent No. 3,697,379      Dated October 10, 1972

Inventor(s) George C. Buzby, Jr.; George Greenspan; Emmett L. Buhle

It is certified that error appears in the above-identified patent and that said Letters Patent are hereby corrected as shown below:

At column 3, line 6 (10 g. per 10 ml.). should read (10 g. per 100 ml.).

At column 6, line 27 in Example X NNRL Y-118 should read NRRL Y-118.

At column 10, Claim 1, farinoso is misspelled and should read farinosa.

Signed and sealed this 24th day of April 1973.

(SEAL)
Attest:

EDWARD M. FLETCHER, JR.
Attesting Officer

ROBERT GOTTSCHALK
Commissioner of Patents